May 12, 1942.  F. W. WHITLOCK  2,282,441
THERMOMETER CONSTRUCTION
Filed April 7, 1938   2 Sheets-Sheet 1

Inventor:
Fred W. Whitlock
By Karl H. Sommermeyer
Atty.

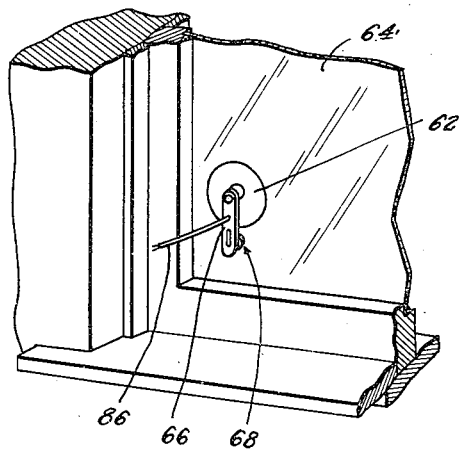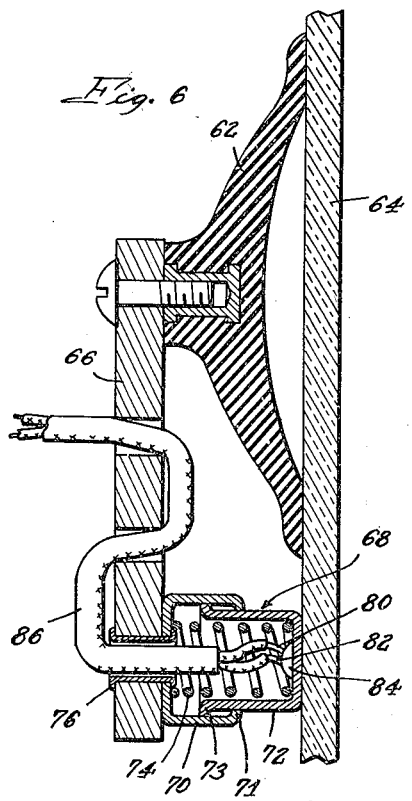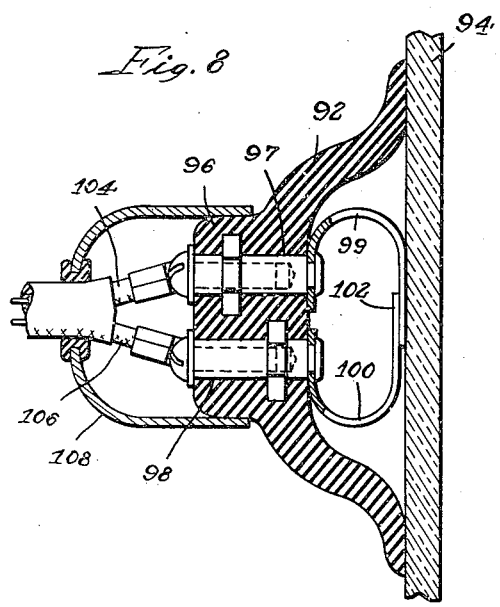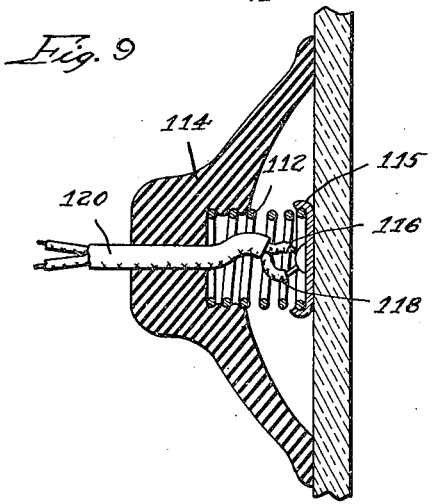

Patented May 12, 1942

2,282,441

UNITED STATES PATENT OFFICE 2,282,441

THERMOMETER CONSTRUCTION

Fred W. Whitlock, Freeport, Ill., assignor to Micro Switch Corporation, Freeport, Ill., a corporation of Illinois Application April 7, 1938, Serial No. 200,809

2 Claims. (Cl. 201—63)

The present invention relates generally to thermometers and to the taking of temperature measurements through partitions, and relates also to electrical thermometers for measuring outdoor temperatures.

In certain building temperature control devices it is desirable to take a measurement of outdoor temperature without having a temperature sensitive element located out of doors. This difficulty may be overcome by placing the temperature sensitive element against the inside surface of an outside wall as, for example against the inside surface of a window pane. It is desirable also to measure steam temperatures by means of thermometers located outside of the steam pipes.

Objects of the present invention include provision of an electric thermometer the temperature sensitive element of which has a high sensitivity of response to the temperature of a surface against which it lies but having a low sensitivity of response to temperatures of the space in which it is located, the provision of a surface thermometer construction adapted to respond rapidly to changes of the surface temperature which it measures, the provision of an improved thermometer construction for measuring temperatures through partitions, and the provision of improved electrical thermo-couple and resistance thermometer constructions. These and other objects of the invention will become apparent from the following description of certain specific embodiments of the invention, which embodiments serve by way of example to illustrate the manner in which the invention may be carried out without, however, limiting the invention to the details of any particular illustration or example. In the drawings:

Figure 1:
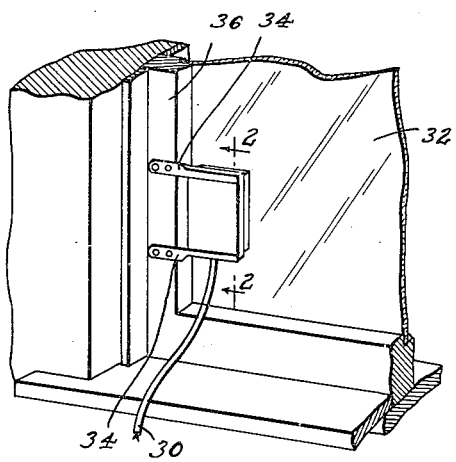
Fig. 1 is a pictorial view of a temperature responsive resistance device constructed in accordance with my present invention and mounted on a window sash.
Figure 2:
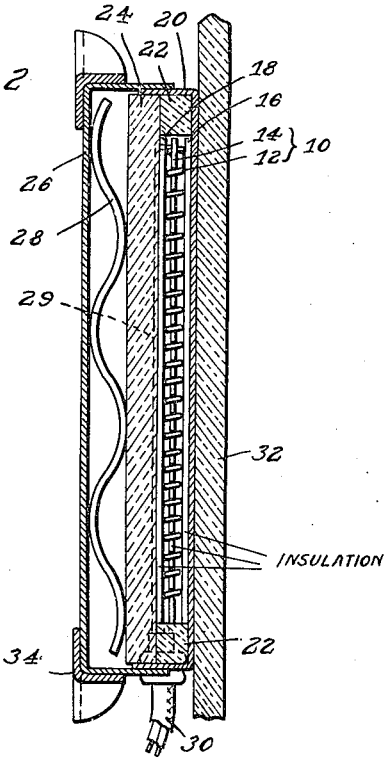
Fig. 2 is a vertical section taken along the lines 2—2 of Fig. 1 to show the interior construction of the device.
Figure 3:
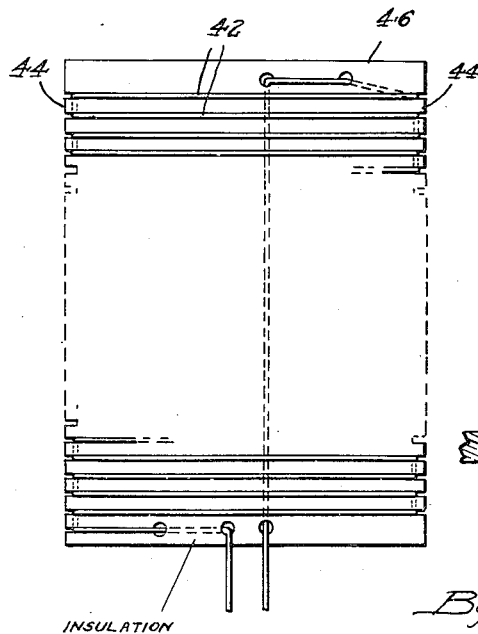
Figure 4:
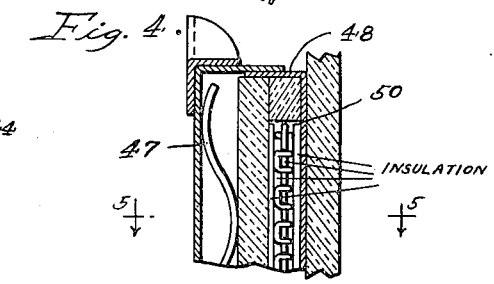
Figure 5:
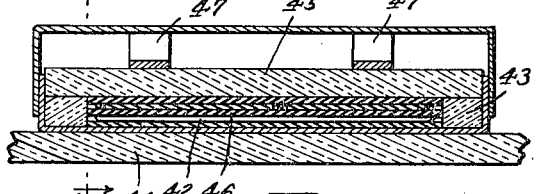

Figs. 3, 4, and 5 illustrate a modified construction for the temperature responsive resistance device of Figs. 1 and 2; Fig. 3 is a detailed view showing the construction of the temperature response to resistance element; Fig. 4 is a partial longitudinal sectional view similar to the view of Fig. 2; Fig. 5 is a transverse sectional view of the modified temperature responsive resistance device;

Fig. 6 is a sectional view of a thermo-couple type of temperature responsive device embodying my present invention;

Fig. 7 is a pictorial view showing the temperature responsive device of Fig. 6 mounted on a window pane; and Figs. 8 and 9 illustrate additional thermo-couple constructions.

In Fig. 2 a temperature responsive resistance element 10 consists of a length of copper or nickel wire 12 wound on a fiber card 14. This resistance element 10 lies between two additional fiber cards 16 and 18 in the bottom of a thin walled, drawn copper box 20. The two cards 14 and 16 are of a thin compact fiber construction which provides good electrical insulation with a comparative good thermal conductivity. Surrounding the four margins of the fiber insulating cards 14, 16 and 18 is a frame 22 of thermal insulating material such as felt which fills the marginal space between the edges of the fiber cards and the wall of the box 20. A layer of additional thermal insulating material 24 covers the resistance element and the fiber cards. A cover 26 fits tightly onto the box 20 and a pair of springs 28 (of which only one appears in Fig. 2) bear against the inner surface of the cover 26 to press the resistance element 10 and its electrical and thermal insulating members firmly into the bottom of the box 20. The two terminals of the resistance element 10 are brought out of the box in a cable 30 through a grommetted hole at one end of the box, one end 29 of the wire 12 being carried over the fiber card 18 and embedded in the layer of thermal insulation 24.

The temperature responsive device assembled in its box 20 and cover 26 is mounted against a window pane 32, as illustrated in Figs. 1 and 2 with the copper bottom of the box against the inside surface of the glass and with the cable 30 down so that moisture condensing on the window pane may not run into the box. A pair of brackets 34 fastened to the sash frame support the device in position against the inside surface of the pane.

The outside surface of the glass is, of course, exposed to outdoor air temperatures, but that portion of the inside surface of the glass against which the box lies is protected from the influence of the indoor temperature by the box 20 itself. The copper bottom of the box 20 and the fiber cards 14 and 16 provide a comparatively small degree of thermal insulation between the resistance wire 12 and the glass 32 and consequently heat travels readily between the wire 12 and the outdoor air to maintain the wire 12 at a temperature very near to that of the outdoor air. At the same time the marginal insulating material 22 and the insulating layer 24, together with the air space overlying the layer 24, serve to a considerable degree to thermally insulate the resistance wire 12 from the temperature of the inside air. The metal of the box 20 is made thin not only to improve the conductivity of heat between the wire 12 and the glass of the window, but also to minimize conduction of heat from that part of the box surface that is exposed to room air to the portion that lies between the wire 12 and the window glass 32. If desired the box 20 may have its marginal portion constructed of a material of relatively low heat conductivity. It will be apparent that the construction of the temperature responsive device is such that the resistance wire 12 will assume a temperature much nearer that of the outside air than that of the inside air which surrounds the temperature responsive structure.

A temperature responsive device such as shown in Figs. 1 and 2 may be used to provide a measurement or index of the outdoor temperature for the control of a heating system of a building. Such heating systems generally are regulated to maintain substantially constant temperatures inside the building. Accordingly, the indoor temperature will remain approximately constant, as, for example, at 70 degrees Fahrenheit. If, for example, the resistance wire 12 assumes an average temperature of 40 degrees Fahrenheit (or 30 degrees below room temperature) when the outdoor temperature is 30 degrees Fahrenheit (40 degrees below room temperature), the effective thermal sensitivity of the temperature responsive device may be said to be 75% in that it experiences only ¾ of the temperature change which the outside air undergoes. The specific value which this thermal sensitivity assumes in any given temperature responsive device depends in part upon the thickness and quality of the layer of thermal insulation 24 in comparison with the thermal insulating effect of the window pane 32 itself. Because the inside air is at a different temperature than that of the outside air, heat continually passes through the temperature responsive structure. This flow of heat provides a series of temperature drops through the temperature responsive structure and the window glass. The temperature difference between the inside air and the resistance wire 12 will be high compared to the temperature difference between the wire 12 and the outside air only if the thermal insulation provided by the layer 24 and its overlying air space is high compared to the thermal insulating effect of the window glass 32 itself. The marginal thermal insulation 22 serves both to reduce the flow of heat between the wire 12 and the sides of the copper box 20 and also to space the wire 12 away from the sides of the box to reduce the effect on the wire 12 of the flow of heat through the glass itself between the covered and uncovered portions of the glass.

In the modification shown in Figs. 3, 4, and 5, the resistance wire 42 instead of being wound around a fiber card is looped over projections 44 along the edges of the card 46, so that all the turns of the wire lie on one face of the card. This card 46 is laid in the bottom of the copper box 48 over a thin sheet of compact fiber material 50. Additional sheets of fiber and thermal insulation are laid over the wire supporting card 46, as shown in Fig. 5 to provide a construction which is otherwise similar to the construction of Figs. 1 and 2. The resistance wire 42 lies directly against the thin fiber insulator 50, and accordingly the construction of Figs. 3 and 4 places the temperature sensitive resistance wire in a closer thermal relation with the outside air than does the construction of Fig. 2. Consequently the construction of Figs. 3 and 4 responds somewhat more rapidly to changes in the outside temperature and also provides a temperature responsive device showing a slightly higher thermal sensitivity to such changes of outside temperature. On the other hand, the construction of Fig. 1 provides a device which may be constructed more easily and cheaply, and which will permit a larger quantity of temperature responsive resistance wire to be arranged in a device of given dimensions.

In Fig. 6 a rubber suction cup 62 grips the inside surface of the window glass 64 to support itself thereon. A bar 66 carried by the cup 62 in turn carries the temperature responsive device proper 68. This temperature responsive device 68 includes a pair of telescoping metal cups 70 and 72, having a spring 74 therein to hold them normally extended. The cup 70 is fastened to the bar 66 by means of a metal grommet 76 and the spring 74 extends the telescoped cups to hold the end of the cup 72 against the inside surface of the window glass 64. The cups 70 and 72 have flanged lips 71 and 73 to prevent the spring 74 from separating them. The flange 71 on the outer cup is formed in a punch press after the other assembly operations.

A pair of thermo-couple leads 80 and 82 are fused into a small pellet of solder 84 and thereby held in thermal engagement with the inside surface of the end wall of the cup 72. The two leads 80 and 82 are of dissimilar metals, such as, for example, iron and an alloy of copper and nickel. Suitable alloys include those marketed under the trade-mark names of "Constantin" and "Manganin." Accordingly, the pellet of solder 84 constitutes a temperature responsive junction of a thermo-couple. Since the end wall of the cup 72 lies directly against the window glass 64 a thermo-couple junction within the pellet of solder 84 is materially affected by the temperature of the air outside surface of the window glass. The diameter of the cup 72 is made sufficiently large in comparison with the thickness of the metal from which it is formed, and in comparison with the thickness of the sheet of window glass 64, so that the temperature of the air surrounding the cups 70 and 72 does not have too great an effect upon the temperature of the thermo-couple junction. The enclosed air space within the cups 70 and 72 provides some insulation between the cylindrical walls of the cup 72 and the thermo-couple wires 80 and 82. The two wires 80 and 82 are assembled into a cable 86 which is threaded out through the grommet 76. The cable 86 is also threaded through a pair of holes in the bar 66 to effectively tie the cable to the bar. The pictorial view of Fig. 7 shows the thermo-couple device of Fig. 6 mounted upon the inside surface of a window pane for measuring the outdoor temperature.

Fig. 8 illustrates a somewhat different thermo-couple construction. Therein a rubber suction cup 92 supports itself upon the inside surface of a window pane 94. This suction cup 92 has a thickened portion 96 through which a pair of dissimilar metal inserts 97 and 98 extend. Supported on the inner ends of these inserts 97 and 98 are a pair of thin resilient metal leaves 99 and 100, each leaf being of the same metal as the insert on which it is supported. These two leaves are welded or soldered together at a junction 102. The resilience of the leaves 99 and 100 is such that they tend to hold the junction 102 firmly against the inside surface of the window glass 94. The inserts 97 and 98 and the leaves 99 and 100 may be constructed of any two metals having substantially different thermo-electric potentials. Each spring leaf is constructed of the same material as its supporting insert, so that no thermal electric potentials may be introduced into the circuit except at the junction 102. A pair of connecting leads 104 and 106 are connected to the outer ends of the inserts 97 and 98, each connecting lead being of the same metal as the insert to which it is connected. These two connecting leads pass out through a hole in a cap 108 which fits over the thickened portion 96 of the suction cup 92 to cover and protect the terminals.

Since each of the leaves or strips 99 and 100 is made of the same metal as its supporting insert and connecting lead, the reference junction of the thermo-couple is located at the apparatus connected to the leads 104 and 106. Alternatively, both of the leads 104 and 106 may be of copper, or the leads and also the inserts 97 and 98 may be of copper. In either case the inserts provide the reference junction. Obviously these inserts will be in much better thermal contact with the room air than with the outdoor air. Consequently, the net potential of the thermo-couple circuit, that is the potential corresponding to the difference of temperature between junction 102 and the inserts 97 and 98, will provide a reliable index of the difference of temperature between the inside air and the outside air.

The construction of Fig. 8 is compact, presents an unusually neat appearance, is exceedingly simple in its construction, places the thermo-couple junction directly against the surface of the glass itself, and provides adequate air insulation in the enclosed spaced within the suction cup 92 to reduce to a minimum the effects of extraneous temperatures. Such extraneous effects include the warming effects of room air upon the rubber of the suction cup 92 itself and upon the uncovered portions of the window glass 94.

In the construction of Fig. 9 an helical spring 112 fits snugly into a cavity on the inner face of a rubber suction cup 114. The spring 112 at its opposite end carries a thin metal cap 115 under which is soldered a pair of dissimilar metal conductors 116 and 118 to provide a thermo-couple junction on the cap 114. These two conductors 116 and 118 form the two conductors of a cable 120 which is sealed through the rubber of the suction cup 115 itself. The suction cup 114 is adapted to hold itself by suction to the inside surface of a window pane to hold the cup 114 and its thermal junction against the window glass, and to provide thermal insulation for the junction in the same manner as the construction of Fig. 8 insulates the thermal junction 102.

The thermometers of the present invention may be employed for example in the systems shown in my copending applications, Serial No. 189,545, filed February 9, 1938, and Serial No. 200,810, filed April 7, 1938. They also may be used for measuring steam temperatures through the walls of steam pipes and for measuring temperatures of liquids through the walls of containers.

It will be apparent to those skilled in the art that the specific constructions, herein shown and described by way of example, may be modified and varied without departing from the spirit and teachings of the invention. Accordingly, the invention is to be limited only in accordance with the scope of the appended claims.

I claim:

1. In combination in a thermometer construction, a flat case having a thin metal wall adapted to lie against one side of a partition in good thermal engagement therewith, a temperature sensitive electrical resistance element, thin electrical insulation of relatively good heat conductivity between said temperature sensitive element and the thin metal wall of said case, and a pack of heat insulating material in said case on the other side of said temperature sensitive element, and a pack of thermal insulating material surrounding the margin of said temperature sensitive element within said case so that said temperature sensitive element engages only the central portion of said thin metal wall that is adapted to lie against the partition as aforesaid, said pack of heat insulating material being of such size and effectiveness as to effectively insulate said temperature sensitive element from the temperature of the space within which said case is located, whereby said temperature responsive resistance element is predominantly responsive to the temperature of the opposite side of said partition and assumes a temperature nearer to that of the opposite of said partition than to that of said space.

2. In combination in a temperature responsive construction for a thermometer for measuring temperatures through a partition, a temperature responsive element, a protective plate having a central portion thereof in thermal engagement with said temperature responsive element, means for supporting said plate in good thermal engagement with one side of the partition, whereby said temperature responsive element must respond to the temperature to be measured through both said partition and said protecting plate, and means for enclosing said temperature responsive element for insulating it where it does not engage said plate and for insulating the margins of said plate surrounding said temperature responsive element, said insulating enclosure being of such size that it covers margins of said plate sufficiently wide compared to the thickness and thermal conductivity of said plate and compared to the thickness and thermal conductivity of the partition with which said plate engages, that the path from the temperature sensitive element through the plate and partition presents a lower thermal resistance, than does the leakage path from the portion of the plate and partition just under the temperature responsive element radially outward to the exposed margins of said plate and partition, whereby said temperature responsive element assumes a temperature nearer that of the opposite side of said partition than to the temperature of the space on the side of the partition on which the temperature responsive device is located.

FRED W. WHITLOCK.